May 14, 1957     H. J. SCHULTZ     2,792,567
BATTERY TESTER
Filed Dec. 27, 1954
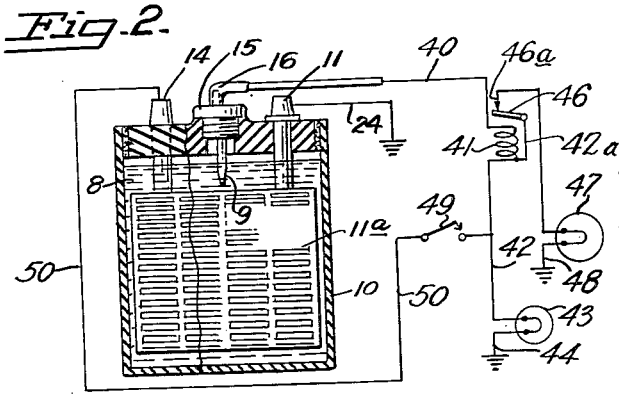
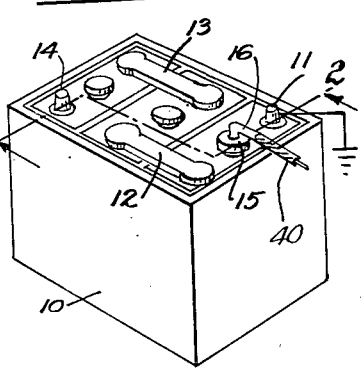
INVENTOR.
Henry J. Schultz
by Brooks Walker

United States Patent Office 2,792,567
Patented May 14, 1957

2,792,567

BATTERY TESTER

Henry J. Schultz, Hayward, Calif., assignor to Brooks Walker, San Francisco, Calif.

Application December 27, 1954, Serial No. 477,815

2 Claims. (Cl. 340—249)

This invention pertains to battery testers for indicating particularly when the level of the liquid is down to a dangerous point and needs refilling.

Other devices have been shown for indicating when the liquid level of the battery is low, but this invention pertains to improvements in such constructions, wherein a probe is inserted in a battery through a filler plug or through the cover of the battery and picks off a small amount of current between the probe and the grounded or other terminals of the battery to operation a switch controlling an indicator light when the circuit is closed, through medium of battery fluid.

Another object of the invention is to utilize an existing switch on the car, such as the stoplight switch, and have an indicator light on the dash board which lights when the stoplight switch is on but if the liquid level in the battery is low. A further object of the invention is to provide a circuit whereby a light lights when the liquid in the battery is at a dangerous low level. This is desirable as many automobiles are currently being provided with a light which lights when the emergency brake is left on, others that lights when the generator does not work, and others that light when the oil pressure is exceedingly low, etc., so that the driver is conscious of lights lighting when something is wrong. In order to accomplish this purpose, we have provided a circuit involving a solenoid operated switch which is connected to the circuit when the engine is running as when the ignition switch is on. This provides current to an indicator light only when there is no current flowing from the battery probe through the very high resistance of said solenoid which operates on an exceedingly small flow of current from said probe. When the liquid level is so low that no circuit flows from said probe the solenoid is not energized and the switch remains closed so that the indicator light will light, indicating that the fluid level in the battery is low.

Other objects of the invention will be more particularly pointed out in the accompanying specifications and claims.

I have illustrated by invention in the accompanying drawings, in which:

Fig. 1 is a perspective view of a battery with the connections as shown in Fig. 2 illustrated.

Fig. 2 is a cut away view, of a battery taken at section 2—2 of Fig. 1, and a wiring diagram of another circuit embodying a further form of the invention.

In all figures like numerals of reference refer to corresponding parts.

In Figs. 1 and 2 I have a battery 10 having a grounded terminal 11 connected to ground by wire 24. A connecting terminal 12 connects the ground cell to the center cell and connecting terminal 13 connects the center cell to the cell on the opposite end with terminal 14 being the hot or 6-volt terminal of a 3-cell battery. Top 15 supports probe 9 which pierces liquid 8 to a point just above the top of battery plates 11a. A detachable connection 16 is secured to the top of probe 9.

In the drawings I have shown the alternate construction designed to provide an indicator light which will light whenever the battery liquid level is low when the car is normally operating. The battery 10 has a probe 9 in the same cell with the ground terminal 11 which is grounded by wire 24. The hot terminal 14 is connected by wire 50 to switch 49 which may be a combination switch with the ignition or foot brake switch or any other suitable switch to close the circuit when the engine is running and prevent discharge of the battery when the car is parked. If the level of the battery liquid is such that the probe 9 is immersed, a small current will be available which is sufficient to energize solenoid switch 41 to pull arm 46 away from contact 46a so that indicator light 47 will not light whenever the liquid is above the probe and the battery is charged. However, when the liquid is low in the battery solenoid switch 41 will not be energized and therefore remains closed when switch 49 is closed so that indicator light 47 will light indicating that the battery liquid is low. In case it is desired to use some other switch, such as the turn indicator switch or the stoplight switch, in place of the ignition switch for the operation of switch 49, a stoplight, such as 43, may be connected through lines 42 and 44 so that stoplight 43 will light when stoplight switch 49 is closed. In this instance battery indicator light 47 will light only if the liquid in the battery is below probe 9 so that solenoid switch 41 is not energized. If the liquid is above the probe and solenoid switch 41 is energized, arm 46 will pull away from contact 46a so that the battery level indicator light 47 will not light. By this design we have provided a means whereby a battery level indicator light will light only when the liquid level in the battery is low. This will conform with the other waring lights currently used on American vehicles, such as the one that warns when the emergency brake is left on when the generator is not generating, or when the oil pressure is low, etc.

Other features of the invention will be more particularly pointed out in the accompanying claims.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. In a vehicle, the combination including a battery of the wet-cell type having at least two poles, one of which is grounded and the other ungrounded; a probe supported from above the battery liquid in a cell having said grounded pole and extending down into said liquid when said liquid is at its high normal level; a stoplight in said vehicle having one side grounded; an electric circuit connecting said ungrounded pole to said stoplight and, in parallel with said stoplight, to said probe; a first switch in said circuit operable at will by an operator of said vehicle for closing said circuit, thereby normally lighting said stoplight and sending some of the current to ground through said probe; a low-battery-liquid-level indicator light, having one side grounded; a second switch adapted when both it and said first switch are closed, to connect said indicator light with said circuit in series with said ungrounded pole; and means energized by the flow of current to said probe from said ungrounded pole for normally holding said second switch open when said first switch is closed, so long as said probe is immersed in said battery liquid and for closing said second switch when said probe is substantially out of contact with said battery liquid.

2. In a vehicle, the combination including a battery of the wet-cell type having at least two poles, one of which is grounded and the other ungrounded; a probe supported from above the battery liquid in a cell having said grounded pole and extending down into the liquid when said liquid is at its high normal level; a stoplight in said vehicle having one side grounded; an electric circuit connecting said ungrounded pole to the other side of said stoplight and, in parallel with said stoplight, to said probe; a first switch in said circuit operable at will by an operator of said vehicle for closing said circuit; a low-battery-liquid-level indicator light, having one side grounded; a second switch adapted when both it and said first switch are closed, to connect said indicator light with said circuit in series with said ungrounded pole; a solenoid energized by flow of current through said probe for normally holding said second switch open when said first switch is closed, as long as said probe is immersed in said battery liquid, said solenoid becoming de-energized and closing said second switch when said probe is out of contact with said battery liquid.

References Cited in the file of this patent

UNITED STATES PATENTS

| | | |
|---|---|---|
| 1,568,829 | Goff | Jan. 5, 1926 |
| 2,064,460 | Carr et al. | Dec. 15, 1936 |
| 2,161,441 | Vickers | June 6, 1939 |
| 2,324,424 | Pollack | July 13, 1943 |
| 2,663,862 | DeAnthony | Dec. 22, 1953 |